Nov. 15, 1955    G. T. McCLURE ET AL    2,723,884
FLUID PRESSURE AND DYNAMIC BRAKE INTERLOCK APPARATUS
Filed Sept. 29, 1950
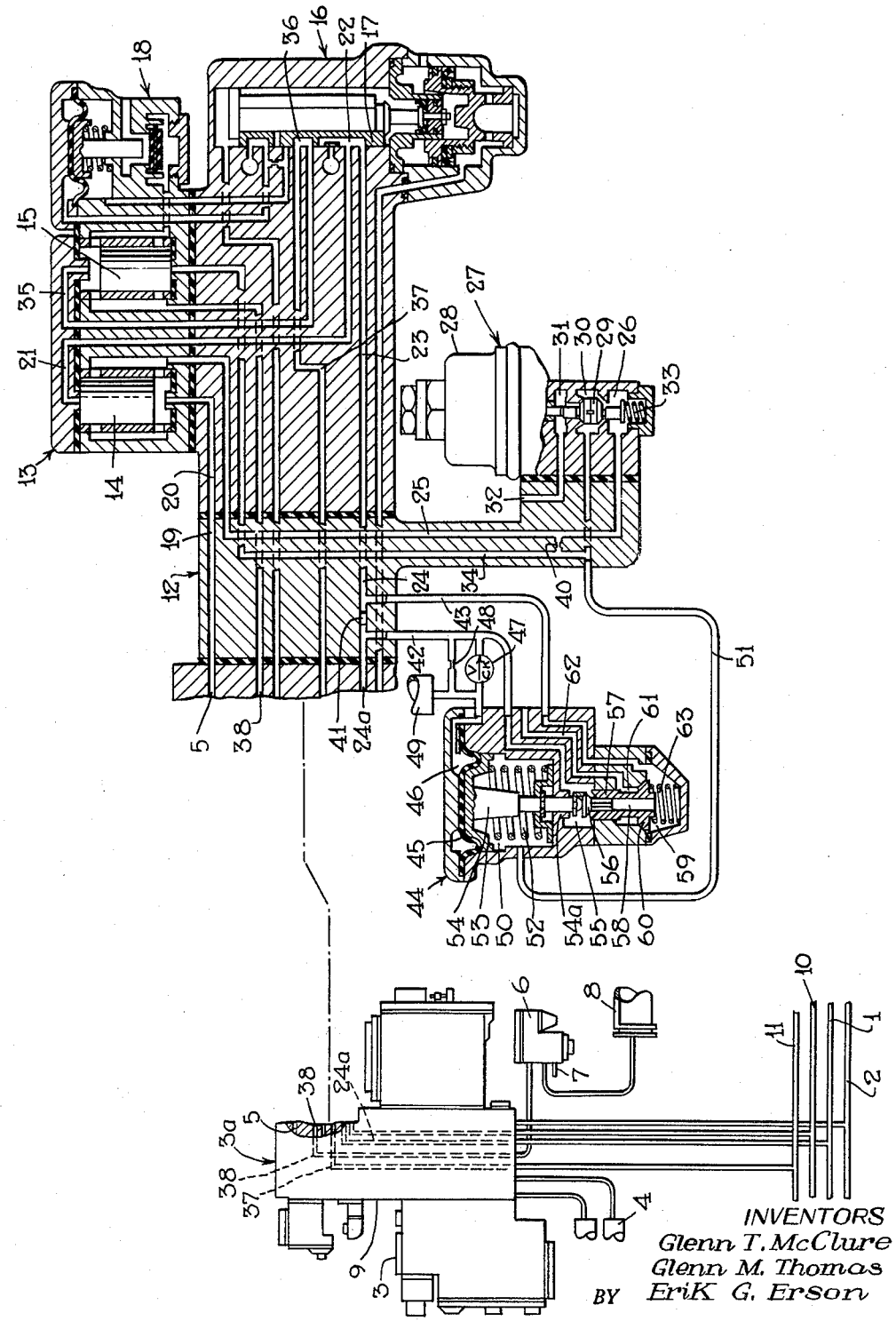
INVENTORS
Glenn T. McClure
Glenn M. Thomas
Erik G. Erson
BY
Frank E. Miller.
ATTORNEY

ശ്രീ2,723,884

FLUID PRESSURE AND DYNAMIC BRAKE INTERLOCK APPARATUS

Glenn T. McClure, McKeesport, Glenn M. Thomas, Dravosburg, and Erik G. Erson, Wilkinsburg, Pa., assignors to Westinghouse Air Brake Company, a corporation of Pennsylvania Application September 29, 1950, Serial No. 187,388

7 Claims. (Cl. 303—3)

This invention relates to fluid pressure brake apparatus and more particularly to the type for use on railway locomotives.

The No. 24RL locomotive brake equipment shown and described in Westinghouse Air Brake Company's Instruction Pamphlet No. 5066 dated March 1948 and as employed on modern diesel electric locomotives, is arranged to control the brakes on the locomotive and cars of a connected train on either the usual automatic principle through the medium of a brake pipe or the electro-pneumatic principle over train wires and through a straight air pipe, an automatic brake valve device being provided on the locomotive for selectively varying the pressure of fluid in the brake pipe and in a control pipe, the pressure in the latter pipe controlling a relay for controlling energization and deenergization of said train wires to provide a pressure in the straight air pipe corresponding to that in said control pipe. An independent brake valve device is also provided on the locomotive for controlling the brakes thereon independently of the brakes on the cars in the well-known manner.

When the automatic brake valve device is conditioned to control the brakes through the straight air pipe, its handle is movable to a release position for venting the straight air pipe to effect a release of brakes on the locomotive and cars of the train and is movable from said release position into an application and release zone for providing fluid in said straight air pipe at a pressure proportional to the extent of movement from said release position, or in accordance with the position in said zone, to provide a corresponding degree of application of brakes on the locomotive and cars of the train.

When conditioned to control the brakes on the locomotive and cars of the train on the automatic principle the brake valve handle is movable to a release position to charge the brake pipe with fluid under pressure to release the brakes, to a service position for reducing the pressure of fluid in the brake pipe to cause a service application of brakes and to a lap position for limiting the degree of reduction in brake pipe pressure and thereby the degree of service application of brakes, it being understood that a brake controlling valve device on each unit of the locomotive and on each car of the train responds to the variations in brake pipe pressure to so control the brakes on the respective unit or cars.

On the locomotive the electric propelling motors are adapted to act as generators to produce dynamic braking of the locomotive and generally it is undesirable that the fluid pressure brakes be effective at the same time as the dynamic brakes, due particularly to the possibility of stalling the driver wheels on the locomotive and causing them to slide on the track rails and develop flat spots which are not only annoying during running of the locomotive but also expensive to remove. Therefore a magnet valve device has been provided to operate, when the dynamic brakes on the locomotive are cut into operation, to prevent an application of the fluid pressure brakes on the locomotive either from the straight air pipe or the brake pipe or to release such an application of fluid pressure brakes if in effect. When the dynamic brakes are cut out of operation, generally at a time when they become substantially ineffective due to slowing down of the train, the magnet valve device is operative to permit reapplication of the fluid pressure brakes.

If at the time the dynamic brakes are cut out of operation the straight air pipe is charged with fluid under pressure for applying the brakes on the cars of the train, the pressure of fluid in said pipe will promptly become effective to reapply the locomotive brakes, while in case the brakes on the cars are applied in response to a reduction in brake pipe pressure and the brake valve device is in lap position the same will occur, since under this latter condition fluid under pressure supplied by the brake controlling valve devices on the locomotive units in response to the reduction in brake pipe pressure will be present in what is known as a displacement volume on each unit and upon cutting out of the dynamic brakes the fluid from said reservoirs will become effective to apply the brakes on the respective units.

It is undesirable to have the fluid pressure brakes on the locomotive units automatically reapply upon cutting out of the dynamic brakes, particularly if the reapplication is of considerable magnitude and which will usually occur at a relatively low speed of the train, since the resulting increase in retardation of the locomotive and cars is liable to cause rough stopping of the train and discomfort to passengers.

The principal object of the invention is therefore the provision of improvements for use in the 24RL equipment which will avoid the above difficulty.

According to this object means are provided to prevent automatic reapplication of the fluid pressure brakes on the locomotive upon the dynamic brakes becoming ineffective and which require, in case a reapplication of the fluid pressure brakes on the locomotive is desired, an operation of the brake valve device by the engineer. If the brakes on the cars are applied in response to pressure of fluid in the straight air pipe then upon cutting out the dynamic brakes it is necessary that the engineer move the brake valve device to release position and reduce the pressure in the straight air pipe down to some low degree, such as five pounds, before he can reapply the locomotive brakes by movement of said brake valve device into the application and release zone. On the other hand if the brakes on the cars of the train are applied in response to a reduction in brake pipe pressure it is necessary for the engineer to move the brake valve handle from lap to service position to reapply the locomotive brakes. In other words, to reapply the locomotive brakes under the condition in question requires positive operation of the brake valve device by the engineer.

Other objects and advantages will become apparent from the following more detailed description of the invention.

In the accompanying drawing, the single figure is a diagrammatic view of a portion of the No. 24RL locomotive embodying the invention.

*Description*

The fluid pressure brake equipment with which the invention is adapted to be associated may be like that disclosed in the instruction pamphlet above referred to in view of which the disclosure in the application drawing and the following description thereof is limited to only such as essential to a clear understanding of the invention.

As shown in the drawing, the reference numerals 1 and 2 designate, respectively, an electro-pneumatic straight air control pipe and a brake pipe both of which are adapted to extend through a locomotive and cars of a train. An engineer's automatic brake valve device (not shown) is adapted to control pressure of fluid in both of the pipes 1 and 2 and when adjusted for controlling pressure of fluid in the pipe 1 is movable to a brake release position for opening the pipe 1 to atmosphere and is movable from said release position into an application and release zone for supplying fluid to said pipe at a pressure proportional to the extent of such movement. When the brake valve device is adjusted for controlling the pressure of fluid in the brake pipe 2, it is operative to a release position to charge said pipe with fluid under pressure, to a service position to effect any desired degree of service reduction in pressure in said pipe and to a lap position to bottle-up the fluid in the brake pipe at the desired reduced pressure.

Reference numeral 3 designates a service portion of a brake controlling valve device 3a, one of which will be provided on each unit of the locomotive, and which is adapted to operate in response to a service reduction in pressure in the brake pipe 2 for supplying fluid under pressure from an auxiliary reservoir 4 to a passage 5 and thence through a communication, to be subsequently described, to a relay valve device 6 for effecting operation thereof to supply fluid at a like pressure from a supply pipe 7 to a brake cylinder device 8 for applying the brakes on the locomotive. When the pressure in the auxiliary reservoir 4 is thus reduced by flow to the relay valve device 6 to a degree slightly lower than in the brake pipe 2 the service portion 3 will move to lap position to prevent further such flow for thereby limiting the pressure of fluid obtained in the relay valve device 6 according to the reduction in pressure in the brake pipe 2. When the brake pipe 2 is recharged with fluid under pressure the service portion 3 will respond thereto and move to release position for opening the passage 5 to atmosphere for releasing fluid under pressure from the relay valve device 6 to cause operation thereof to release fluid under pressure from the brake cylinder device 8 to release the locomotive brakes.

As will be seen from the drawing, the brake controlling valve device 3a comprises a bracket 9 upon one face of which is mounted the service portion 3 and to which is connected the auxiliary reservoir 4, the relay valve device 6, the straight air pipe 1, the brake pipe 2, a so-called actuating pipe 10 and an independent application and release pipe 11. Mounted on another face of the bracket 9 is a dynamic interlock device 12 and carried by said device is an independent application and release or interlock valve device 13.

The interlock valve device 13 comprises two double check valves 14, 15, a selector valve device 16 comprising a slide valve 17 having a normal position, in which it is shown in the drawing, providing for control of brakes on the locomotive from either the straight air pipe 1, the brake pipe 2 or through the independent and application and release pipe 11, and a quick release valve device 18, the operation of which is not pertinent to an understanding of the invention. The independent application and release pipe 11 is adapted to be connected to an engineer's independent brake valve device (not shown) which is operative to supply fluid under pressure to and release fluid under pressure from said pipe for controlling application and release of locomotive brakes independently of the straight air pipe 1 and brake pipe 2, as will be later described.

The passage 5 in pipe bracket 9 is connected through a passage 19 in the dynamic interlock device 12 to a passage 20 open to one end of the double check valve 14, the opposite end of which is open to one end of a passage 21, which is connected through a cavity 22 in the normal position of slide valve 17 to a passage 23 connected to a passage 24 in the dynamic brake interlock device 12 and adapted to be open, by means to be later described, when the dynamic brakes on the locomotive are ineffective, to a passage 24a in the pipe bracket and thence to the straight air pipe 1.

When by operation of the service portion 3 of the brake controlling valve device 3a fluid under pressure is supplied to passage 5, as above described, such fluid will flow to the lower end of check valve 14 and shift said check valve to an upper position, in which it is shown in the drawing, and then flow to a passage 25 in the dynamic brake interlock device 12. When fluid under pressure is supplied to the straight air pipe 1 such fluid will normally flow through passages 24a, 24, 23, cavity 22 in slide valve 17 and passage 21 to the upper end of the double check valve 14 and shift said check valve to a lower position and then flow to passage 25.

Passage 25 leads to a chamber 26 in a dynamic brake interlock magnet valve device 27 constituting a part of the dynamic interlock device 12. The magnet valve device 27 comprises a magnet 28 which is adapted to be energized when the dynamic brakes on the locomotive are effective to brake the locomotive and deenergized when said brakes are ineffective.

The magnet 28 is arranged to control a double seating valve 29 contained in a chamber 30. Upon energization of magnet 28 it is adapted to seat valve 29 in a direction to close communication between chamber 26 and chamber 30 and open the latter chamber to a chamber 31 which is constantly open to atmosphere through a passage 32. Upon deenergization of magnet 28 a spring 33 is adapted to seat valve 29 in the opposite direction for closing communication between chambers 30 and 31 and for opening chamber 30 to chamber 26. The chamber 30 is connected by a passage 34 extending through the dynamic interlock valve device 12 and the interlock valve device 13 to the lower end of the double check valve 15. The opposite end of the double check valve 15 is open to a passage 35 which is open through a cavity 36 in the selector slide valve 17, when in its normal position, to a passage 37 extending through the interlock valve device 13, the dynamic brake interlock valve device 12 and pipe bracket 9 of the brake controlling valve device 3a to the application and release pipe 11.

With the structure so far described, it will be noted that when the dynamic brakes on the locomotive are ineffective and the magnet 28 consequently deenergized and the valve 29 seated in its upper position, if by operation of the service portion 3 of the brake controlling valve device 3a fluid under pressure is supplied to passage 5, such fluid will flow through passages 19, 20, past the lower end of double check valve 14 to passage 25, thence past the double seating magnet controlled valve 29 to passage 34 and from the latter passage past the lower end of double check valve 15 to a passage 38 connected to the relay valve device 6 whereby such fluid may operate said relay valve device for applying the locomotive brakes. On the other hand, if fluid under pressure is supplied to the straight air pipe 1 it will flow past the upper end of the double check valve 14 to passage 25 and thence through the communication just described to the relay valve device 6 for operating same to apply the locomotive brakes, the application occurring in both cases past the valve 29 with the magnet 28 deenergized which occurs when the dynamic brakes on the locomotive are ineffective.

If the dynamic brakes on the locomotive are effective and the magnet 28 is consequently energized seating valve 29 in its lower position, fluid under pressure will be blocked against flow to passage 34 and said passage will be vented past said valve and through passage 32 to atmosphere. Consequently, if either an automatic or an electro-pneumatic straight air application of brakes is in effect at the time that the dynamic brakes are cut into operation such application of brakes will be released, or if such an application of brakes is not in effect at the time the dynamic brakes are cut into operation it will be prevented by the valve 29 seated in its lower position venting the passage 34.

When the dynamic brakes are cut out of operation it is desired that an automatic application of the fluid pressure brakes be prevented by fluid under pressure which may be present in the straight air pipe 1 for applying the car brakes or by fluid under pressure which may be present in passage 25 from the service portion 3 which might be in either lap or service position as a result of reducing brake pipe pressure to apply the car brakes. In other words, if an application of the fluid pressure brakes on the locomotive is desired at the time the dynamic brakes are cut out it is desirable that such be at the discretion of the engineer.

To this end, according to the invention, we open passage 25 to passage 34 through a leak or bleed choke or port 40 so that while the dynamic brakes are effective if by operation of the service portion 3 of the brake controlling valve device 3a fluid under pressure should be present in passage 5 at the time that the dynamic brakes were cut into operation or were supplied to said passage while the dynamic brakes were effective, such fluid would leak away through said port to passage 34 and thence to atmosphere past the magnet valve 29 which would be seated in its lower position. With passage 5 thus vented when the dynamic brakes are effective no application of the fluid pressure brakes on the locomotive will occur upon cutting out of the dynamic brakes unless the engineer desires such and intentionally operates the automatic brake valve device to reduce the pressure in the brake pipe to cause operation of the service portion 3 to supply fluid under pressure to passage 5 to obtain an application.

We further close communication through passage 24 in the dynamic brake interlock device 12 as by a plug 41 and connect to said passage at opposite sides of said plug two pipes 42 and 43, respectively, which lead to a valve device 44 which we add to the equipment.

The valve device 44 comprises a casing containing a movable abutment preferably in the form of a flexible diaphragm 45 at one side of which is a chamber 46 open to the pipe 42 through a check valve 47 and a communication by-passing said check valve and containing a choke 48. The check valve 47 is arranged to prevent flow through it in the direction from pipe 42 to chamber 46 but to permit flow in the opposite direction at a relatively fast rate as compared to the flow capacity of choke 48 to permit flow from pipe 42 to chamber 46. A volume 49 is open to the communication just mentioned at the side of choke 48 adjacent chamber 46.

At the opposite side of diaphragm 45 is a chamber 50 connected by a pipe 51 to passage 34 in the dynamic brake interlock device 12, said chamber containing a spring 52 urging a follower 53 against the adjacent face of diaphragm 45 with a chosen force.

A stem 54 projects from follower 53 through chamber 50 and a suitable bore, in sliding contact with the wall thereof, formed in a partition 54a separating said chamber from a chamber 55 and into the latter chamber which is open to pipe 42. A poppet valve 56 contained in chamber 55 is connected to the adjacent end of stem 54 and arranged to cooperate with a seat provided on one end of a movable plunger 57 to control communication between said chamber and an axial bore 58 extending through said plunger and opening to a chamber 59 which is open to pipe 43. A valve 60 in chamber 59 is formed on the adjacent end of plunger 57 and arranged to cooperate with a seat in the casing to control communication between said chamber and an annular chamber 61 encircling the plunger and which is open to atmosphere through a passage 62. It will be noted that valve 60 seats in the direction of valve 56 and a spring 63 in chamber 59 acts on valve 60 for urging it toward its seat.

In operation, when the straight air pipe 1 and passage 24a are vented, diaphragm chamber 46 in valve device 44 will also be vented past check valve 47 and through pipe 42 under which condition spring 52 opens valve 56 and permits closing of valve 60. With valve 56 open pipe 42 is open past said valve through bore 58 in plunger 57 and chamber 59 to pipe 43.

With the dynamic brakes on the locomotive cut out, when fluid under pressure is supplied to the straight air pipe 1 to apply the brakes on the locomotive and cars of a train, the fluid under pressure from said pipe will flow through passage 24a, pipe 42 and choke 48 to volume reservoir 49 and diaphragm chamber 46 in the device 44 and at the same time from pipe 42 past the open valve 56 therein to pipe 43, thence through passages 24, 23, cavity 22 in the selector slide valve 17 to passage 21, past the upper end of the double check valve 14 to passage 25 and from passage 25 past the magnet controlled valve 29, which is seated in its upper position, to passage 34 and thence past the double check valve 15 to the relay valve device 6 for operating same to cause operation of the brake cylinder device 8 to apply the locomotive brakes.

As fluid under pressure is thus supplied through passage 34 to the relay valve device 6, the pressure of such fluid will become effective through pipe 51 in chamber 50 below the diaphragm 45 in the valve device 44. The choke 48 is so related to the combined volumes of reservoir 49 and diaphragm chamber 46 as to so delay the increase in pressure of fluid in chamber 46 with respect to the increase in pressure in passage 34, the relay valve 6 and diaphragm chamber 50, that the fluid pressure obtained in chamber 50 plus the pressure of spring 52 will hold the diaphragm 45 in the position in which it is shown in the drawing opening valve 56, while effecting a straight air application of brakes as just described.

Upon release of fluid under pressure from the straight air pipe 1 to effect a release of brakes, the pressure in chamber 46 in the valve device 44 will reduce past the check valve 47 into pipe 42 with the reduction in pressure in the straight air pipe and thus ahead of the reduction in pressure in chamber 50 so that the parts of the valve device 44 will remain in the position in which they are shown in the drawing to permit release of fluid under pressure from the relay valve device 6 past the open valve 56 in the device 44 to the straight air pipe to effect a release of the brakes on the locomotive.

It will therefore be seen that when the dynamic brakes on the locomotive are not in operation that the position of the parts of the valve device 44 will remain as shown in the drawing and that application and release of locomotive brakes from the straight air pipe will occur the same as before and as above described.

Now let it be assumed that the brakes on the locomotive are applied by fluid under pressure from the straight air pipe 1 acting in the relay valve device 6 and that the dynamic brakes on the locomotive are rendered effective. The magnet 28 will as a consequence become energized and seat valve 29 in its lower position. Upon seating of valve 29 in its lower position communication is closed from the straight air pipe 1 to passage 34 leading to the relay valve device 6, and said passage is opened to atmosphere through passage 32, as a result of which, the fluid under pressure present in said relay valve device will be vented to atmosphere which will release the locomotive brakes. As fluid under pressure is thus vented from passage 34 to release the locomotive brakes the fluid under pressure present in chamber 50 in the valve device 44 will likewise be vented which will permit the straight air pipe pressure acting in chamber 46 of said valve device to deflect the diaphragm 45 against spring 52 and operate stem 54 to seat valve 56 against plunger 57 and then move said plunger against spring 63 to open valve 60. This closing of valve 56 closes communication between pipes 42 and 43 while the opening of valve 60 opens the latter pipe to atmosphere via passage 62, this operation of these valves at this immediate time being of no consequence however since passages 25 and 34 are disconnected from each other and the latter vented via the magnet controlled valve 29, as above described.

With the dynamic brakes on and the fluid pressure brakes released on the locomotive and the straight air pipe 1 charged with fluid under pressure, for causing the brakes on the cars of a connected train to be applied, assume that the dynamic brakes are cut out in response to which the magnet 28 becomes deenergized permitting seating of valve 29 in its upper position. This opens communication between passages 25 and 34, but said passages and chamber 50 in the valve device 44 remain vented past the upper end of the double check valve 14, through passage 21, cavity 22 in the selector slide valve 17, passages 23, 24, pipe 43 past the open valve 60 in the valve device 44 and thence through the atmospheric passage 62.

With the dynamic brakes cut out if the engineer now desires to reapply the locomotive brakes he must move the automatic brake valve device to release position for releasing fluid under pressure from the straight air pipe 1 and thereby from chamber 46 in the valve device 44 until the pressure of such fluid is sufficiently reduced for spring 52 in said device to return the diaphragm 45 and stem 54 to their upper position. As the stem 54 thus returns to its upper position the valve 60 is closed by spring 63 after which the stem 54 opens the valve 56. The closing of valve 60 disconnects pipe 43 from atmosphere while the opening of valve 56 reopens said pipe to pipe 42 whereupon the engineer may operate his automatic brake valve device to supply fluid under pressure to the straight air pipe 1 and the locomotive brakes will reapply along with the brakes on the train in the same manner as before described.

The application and release pipe 11 being connected through passage 37, cavity 36 in the selector slide valve 17 and passage 35 to the top of the double check valve 15 permits application and release of the locomotive fluid pressure brakes by operation of the engineer's independent brake valve device at any time when not applied by operation of the service portion 3 of the brake controlling valve device 3a or by fluid under pressure from the straight air pipe 1.

*Summary*

It will now be seen that when the dynamic brakes on the locomotive are cut into operation an application of the fluid pressure brakes on the locomotive will be automatically released and said brakes will not automatically reapply upon the dynamic brakes being cut out of operation. To reapply the fluid pressure brakes on the locomotive upon cutting out of the dynamic brakes it is necessary for the engineer to intentionally operate his automatic brake valve device to either reduce the pressure of fluid in the brake pipe or to vent the straight air pipe and then recharge the straight air pipe, as the case may be. Regardless of the condition existing however, whenever the fluid pressure brakes on the locomotive are released, they may be applied and released, as desired, through the application and release pipe by operation of the engineer's independent brake valve device.

Having now described our invention, what we claim as new and desire to secure by Letters Patent, is:

1. In a fluid pressure brake apparatus, in combination, means operable by fluid under pressure to effect an application of brakes, a double check valve, a communication connecting the side outlet of said double check valve to said fluid pressure operable means for conveying fluid under pressure thereto and therefrom, a brake pipe, a brake controlling valve device operative upon a reduction in pressure in said brake pipe for supplying fluid under pressure to one end of said double check valve and thence through said communication to said fluid pressure operable means, a straight air pipe for conveying fluid under pressure to the opposite end of said double check valve for supply through said communication to said fluid pressure operable means, a dynamic brake magnet device operative upon energization to close said communication and release fluid under pressure from said fluid pressure operable means and to also establish a leak from the portion of said communication open to said outlet of said double check valve, and means controlling communication between said straight air pipe and said opposite end of said double check valve responsive to energization of said magnet device to close said communication and maintain such communication closed until subsequent release of fluid under pressure from said straight air pipe.

2. In a fluid pressure brake apparatus, in combination, means operable by fluid under pressure to effect an application of brakes, a double check valve, a communication connecting the side outlet of said double check valve to said fluid pressure operable means for conveying fluid under pressure thereto and therefrom, a brake pipe, a brake controlling valve device operative upon a reduction in pressure in said brake pipe for supplying fluid under pressure to one end of said double check valve and thence through said communication to said fluid pressure operable means, a straight air pipe for conveying fluid under pressure to the opposite end of said double check valve for supply through said communication to said fluid pressure operable means, a dynamic brake magnet device operative upon energization to close said communication and release fluid under pressure from said fluid pressure operable means and to also establish a leak from the portion of said communication open to said outlet of said double check valve, and a valve device comprising movable abutment means subject opposingly to pressure of fluid in two chambers one of which is open to said straight air pipe and the other to said fluid pressure operable means, and valve means operable by said abutment means upon supply of fluid under pressure to or release of fluid under pressure from both of said chambers to establish communication from said straight air pipe to said opposite end of said double check valve and upon release of fluid under pressure from said other chamber to close such communication and vent said other chamber.

3. In a fluid pressure brake apparatus, in combination, means operable by fluid under pressure to effect an application of brakes, a double check valve, a communication connecting the side outlet of said double check valve to said fluid pressure operable means for conveying fluid under pressure thereto and therefrom, a brake pipe, a brake controlling valve device operative upon a reduction in pressure in said brake pipe for supplying fluid under pressure to one end of said double check valve and thence through said communication to said fluid pressure operable means, a straight air pipe for conveying fluid under pressure to the opposite end of said double check valve for supply through said communication to said fluid pressure operable means, a dynamic brake magnet device operative upon energization to close said communication and release fluid under pressure from said fluid pressure operable means and to also establish a leak from the portion of said communication open to said outlet of said double check valve, and a valve device comprising movable abutment means subject opposingly to pressures of fluid in two chambers one of which is open to said straight air pipe and the other to said fluid pressure operable means, valve means operable by said abutment means upon supply of fluid under pressure to or release of fluid under pressure from both of said chambers to establish communication from said straight air pipe to said opposite end of said double check valve and upon release of fluid under pressure from said other chamber to close such communication and vent said other chamber, and a choke and check valve arranged in by-passing relation to each other in the communication between said straight air pipe and said one chamber with the outlet of said check valve opening in the direction of said straight air pipe, said check valve controlling a communication of greater flow capacity than that of said choke.

4. In a fluid pressure brake apparatus, in combination, a brake pipe, brake controlling means comprising a pipe bracket and means operative upon a reduction in brake pipe pressure to supply fluid under pressure to one passage on said bracket, a straight air pipe open to a second passage in said bracket, a valve device including a double check valve, a filler piece carried on a mounting face of said bracket and carrying said valve device and comprising first and second passageways for, respectively, opening said passages in said bracket to opposite ends of said double check valve, means operable by fluid under pressure to effect an application of brakes, said filler piece comprising a third passageway open to the side outlet of said double check valve, a fourth passageway open to said fluid pressure operable means, a restricted communication opening said third passageway to said fourth passageway, a dynamic magnet device carried by said filler piece operative upon energization to close communication between said third and fourth passageways and for opening said fourth passageway to atmosphere and upon deenergization to open such communication, a plug in said second passageway in said filler piece closing communication therethrough, movable abutment means subject opposingly to pressures of fluid in first and second chambers, means operative upon substantial equalization of said opposing pressures to open communication between opposite sides of said plug and operative upon a chosen preponderance in pressure in said one chamber over the opposing pressure to close communication between opposite sides of said plug and to vent the portion of said second passageway leading to said double check valve, means opening said first chamber to said second passageway at the opposite side of said plug including a choke for restricting flow of fluid under pressure to said first chamber and a communication including a check valve providing for more rapid release of fluid under pressure from said first chamber, and a pipe opening said second chamber to said third passageway.

5. In a fluid pressure brake apparatus, in combination, means operable by fluid under pressure to effect an application of brakes, a double check valve, a communication connecting the side outlet of said double check valve to said fluid pressure operable means for conveying fluid under pressure thereto and therefrom, a brake pipe, a brake controlling valve device operative upon a reduction in pressure in said brake pipe for supplying fluid under pressure to one end of said double check valve for supply through said communication to said fluid pressure operable means, a straight-air pipe for conveying fluid under pressure to the opposite end of said double check valve for supply through said communication to said fluid pressure operable means, a dynamic brake magnet device operative upon energization to close said communication and release fluid under pressure from said fluid pressure operable means and to also establish a restricted vent from the portion of said communication between said double check valve and said magnet device, and means adapted to be operated by fluid under pressure in said straight-air pipe to close communication between said straight-air pipe and said vent.

6. In a fluid pressure brake apparatus, in combination, means operable by fluid under pressure to effect an application of brakes, a double check valve, a communication connecting the side outlet of said double check valve to said fluid pressure operable means for conveying fluid under pressure thereto and therefrom, a brake pipe, a brake controlling valve device operative upon a reduction in pressure in said brake pipe for supplying fluid under pressure to one end of said double check valve for supply through said communication to said fluid pressure operable means, a straight-air pipe for conveying fluid under pressure to the opposite end of said double check valve for supply through said communication to said fluid pressure operable means, a dynamic brake magnet device operative upon energization to close said communication and release fluid under pressure from said fluid pressure operable means, a restricted passageway for releasing fluid under pressure from the portion of said communication connected to said double check valve upon energization of said magnet device, and means adapted to be operated by fluid under pressure in said straight-air pipe to close communication between said straight-air pipe and said passageway.

7. In a fluid pressure brake apparatus, in combination, means operable by fluid under pressure to effect application of brakes and upon release of fluid under pressure a release of said brakes, a brake control pipe to and from which fluid under pressure is adapted to be supplied and released, respectively, a dynamic brake magnet device controlling communication between said pipe and said fluid pressure operable means and operative upon energization to close said communication and open an atmospheric vent to said fluid pressure operable means and operative upon deenergization to open said communication and close said vent, a valve device comprising movable abutment means adapted to be subject opposingly to pressure of fluid in two chambers one of which is open to said pipe and the other to said fluid pressure operable means, and valve means controlling said communication between said pipe and said magnet device and effective upon supply of fluid under pressure to or release of fluid under pressure from both of said chambers in substantial unison to open said pipe to said magnet device, said abutment means being operative by pressure of fluid in said one chamber upon release of fluid under pressure from said other chamber by energization of said magnet device to effect operation of said valve means to close said communication from said pipe to said magnet device.

References Cited in the file of this patent

UNITED STATES PATENTS

| | | |
|---|---|---|
| 1,442,269 | Hamilton | Jan. 16, 1923 |
| 1,442,305 | Stearns | Jan. 16, 1923 |